US012776041B2

(12) United States Patent
Yoo et al.

(10) Patent No.: US 12,776,041 B2
(45) Date of Patent: Oct. 27, 2026

(54) MULTISCALE SUBNETWORK FUSION WITH ADAPTIVE DATA SAMPLING FOR BRAIN LESION DETECTION AND SEGMENTATION

(71) Applicants: Siemens Medical Solutions USA, Inc., Malvern, PA (US); The Regents of The University of Michigan, Ann Arbor, MI (US)

(72) Inventors: Youngjin Yoo, Princeton, NJ (US); Eli Gibson, Plainsboro, NJ (US); Yue Cao, Ann Arbor, MI (US); James Michael Balter, Ann Arbor, MI (US)

(73) Assignees: Siemens Medical Solutions USA, Inc., Malvern, PA (US); The Regents of The University of Michigan, Ann Arbor, MI (US)

( * ) Notice: Subject to any disclaimer, the term of this patent is extended or adjusted under 35 U.S.C. 154(b) by 331 days.

(21) Appl. No.: 18/469,760

(22) Filed: Sep. 19, 2023

(65) Prior Publication Data

US 2025/0095155 A1 Mar. 20, 2025

(51) Int. Cl.
*G06T 7/11* (2017.01)
*G06T 7/00* (2017.01)

(52) U.S. Cl.
CPC .............. *G06T 7/11* (2017.01); *G06T 7/0012* (2013.01); *G06T 2207/20081* (2013.01); *G06T 2207/20084* (2013.01); *G06T 2207/30016* (2013.01); *G06T 2207/30096* (2013.01)

(58) Field of Classification Search
CPC ..................... G06T 7/0012; G06T 7/11; G06T 2207/20081; G06T 2207/20084; G06T 2207/30016; G06T 2207/30096
See application file for complete search history.

(56) References Cited

U.S. PATENT DOCUMENTS

| | | | | |
|---|---|---|---|---|
| 2003/0182249 | A1* | 9/2003 | Buczak | H04N 21/454 348/E7.054 |
| 2017/0116744 | A1* | 4/2017 | Abedini | G06T 7/90 |
| 2019/0026897 | A1* | 1/2019 | Wu | G06T 11/005 |
| 2019/0251694 | A1* | 8/2019 | Han | G06N 3/08 |

(Continued)

OTHER PUBLICATIONS

Zhao et al. "3D-2D GAN based brain metastasis synthesis with configurable parameters for fully 3D data augmentation." Medical Imaging 2023: Image Processing. vol. 12464. SPIE, Apr. 2023. (Year: 2023).*

(Continued)

*Primary Examiner* — Katrina R Fujita

(57) ABSTRACT

Systems and methods for segmenting one or more lesions from medical image patches are provided. An input medical image patch depicting one or more lesions is received. The one or more lesions are segmented from the input medical image patch using a plurality of machine learning based segmentation networks to respectively generate a plurality of initial segmentation masks. Each of the plurality of machine learning based segmentation networks is trained to segment lesions from patches with a different field of view size. A final segmentation mask of the one or more lesions is generated based on the plurality of initial segmentation masks. The final segmentation mask of the one or more lesions is output.

13 Claims, 6 Drawing Sheets

200

(56) References Cited

U.S. PATENT DOCUMENTS

| | | | | |
|---|---|---|---|---|
| 2020/0380687 | A1* | 12/2020 | Avital | A61B 5/7267 |
| 2021/0248736 | A1* | 8/2021 | Kamen | G06V 10/454 |
| 2022/0067927 | A1* | 3/2022 | Yang | G06T 7/0012 |
| 2022/0189028 | A1* | 6/2022 | Yoo | G16H 50/50 |
| 2022/0319704 | A1* | 10/2022 | Feng | G06T 7/0012 |
| 2023/0230241 | A1* | 7/2023 | Lure | G06T 7/11<br>382/128 |
| 2024/0321458 | A1* | 9/2024 | Puiu | G16H 10/60 |
| 2025/0045951 | A1* | 2/2025 | Das | G06V 20/70 |

OTHER PUBLICATIONS

Ding et al. "RFNet: Region-aware fusion network for incomplete multi-modal brain tumor segmentation." Proceedings of the IEEE/CVF international conference on computer vision. 2021. (Year: 2021).*

Vang et al. "SynergyNet: a fusion framework for multiple sclerosis brain MRI segmentation with local refinement." 2020 IEEE 17th international symposium on biomedical imaging (ISBI). IEEE, 2020. (Year: 2020).*

Kamnitsas et al., "Efficient multi-scale 3D CNN with fully connected CRF for accurate brain lesion segmentation", Medical Image Analysis, 2017, pp. 61-78.

Xu et al., "Orchestral fully convolutional networks for small lesion segmentation in brain MRI", IEEE 15th International Symposium on Biomedical Imaging, 2018, 4 pgs.

Shirokikh et al., "Universal loss reweighting to balance lesion size inequality in 3D medical image segmentation", arXiv:2007.10033v1, 2020, pp. 1-12.

Chartrand et al., "Automated Detection of Brain Metastases on T1-Weighted MRI Using a Convolutional Neural Network: Impact of Volume Aware Loss and Sampling Strategy", Journal of Magnetic Resonance Imaging, 2022, pp. 1-14.

Extended European Search Report (EESR) mailed Feb. 19, 2025 in corresponding European Patent Application No. 24201233.4.

Yoo Youngjin et al: "Evaluating deep learning methods in detecting and segmenting different sizes of brain metastases on 3D post-contrast T1-weighted images", Journal of Medical Imaging, Society of Photo-Optical Instrumentation Engineers, 1000 20th St. Bellingham WA 98225-6705 USA, vol. 8, No. 3, May 1, 2021 (May 1, 2021), p. 37001.

Hu Szu-Yeu et al: "Multimodal Volume-Aware Detection and Segmentation for Brain Metastases Radiosurgery", Oct. 10, 2019 (Oct. 10, 2019), Springer, pp. 61-69.

Dey Raunak et al: "Hybrid Cascaded Neural Network for Liver Lesion Segmentation", 2020 IEEE 17th International Symposium on Biomedical Imaging (ISBI), IEEE, Apr. 3, 2020 (Apr. 3, 2020), pp. 1173-1177.

* cited by examiner

FIG. 3

300

| Metastasis volume ($cm^3$) | Lesion-level sensitivity | Avg. True Positive DICE | Avg. True Positive Hausdorff95 |
|---|---|---|---|
| < 0.1 (N=370) | 0.755 | 0.726 | 1.15 mm |
| 0.1 ~ 0.3 (N=143) | 0.979 | 0.773 | 1.23 mm |
| 0.3 ~ 0.6 (N=67) | 0.985 | 0.842 | 1.27 mm |
| 0.6 ~ 1.0 (N=32) | 0.969 | 0.850 | 1.68 mm |
| 1.0 ~ 2.0 (N=34) | 1.0 | 0.881 | 1.28 mm |
| 2.0 ~ 5.0 (N=54) | 0.981 | 0.881 | 1.76 mm |
| 5.0 ~ 10.0 (N=20) | 1.0 | 0.901 | 2.23 mm |
| 10.0 ~ 20.0 (N=11) | 1.0 | 0.929 | 1.59 mm |
| > 20.0 (N=8) | 1.0 | 0.869 | 4.78 mm |

MULTISCALE SUBNETWORK FUSION WITH ADAPTIVE DATA SAMPLING FOR BRAIN LESION DETECTION AND SEGMENTATION

STATEMENT REGARDING FEDERALLY SPONSORED RESEARCH OR DEVELOPMENT

This invention was made with government support under grant number R01CA262182 awarded by the National Institutes of Health. The government has certain rights in the invention.

TECHNICAL FIELD

The present invention relates generally to medical imaging analysis, and in particular to multiscale subnetwork fusion with adaptive data sampling for brain lesion detection and segmentation.

BACKGROUND

Brain lesions are areas of damaged brain tissue due to, e.g., illness, injury, disease, or infection. Brain metastases are a type of brain lesions that form when cancer cells spread to the brain. Current treatment options for brain lesions, such as, e.g., stereotactic radiosurgery, can benefit from the accurate and consistent automated detection and segmentation of brain lesions. However, brain metastases and other brain lesions have great variability in location, size, shape, and pathology. Due to this variability, accurately detecting small brain lesions and segmenting large complex lesions at the same time can be challenging.

BRIEF SUMMARY OF THE INVENTION

In accordance with one or more embodiments, systems and methods for segmenting one or more lesions from medical image patches are provided. An input medical image patch depicting one or more lesions is received. The one or more lesions are segmented from the input medical image patch using a plurality of machine learning based segmentation networks to respectively generate a plurality of initial segmentation masks. Each of the plurality of machine learning based segmentation networks is trained to segment lesions from patches with a different field of view size. A final segmentation mask of the one or more lesions is generated based on the plurality of initial segmentation masks. The final segmentation mask of the one or more lesions is output.

In one embodiment, the plurality of initial segmentation masks is combined and the final segmentation mask is generated based on the combined initial segmentation masks. The plurality of initial segmentation masks may be combined by combining intensity values of corresponding voxels in the plurality of initial segmentation masks into respective scores. The final segmentation mask may be generated based on the scores using a machine learning based fusion network.

In one embodiment, the plurality of machine learning based segmentation networks are trained by extracting training patches from training medical images depicting at least one lesion. The training patches are extracted from the training medical images based on a size of the at least one lesion.

In one embodiment, at least some of the plurality of machine learning based segmentation networks are trained with different loss functions. In one embodiment, at least some of the plurality of machine learning based segmentation networks are implemented with different network architectures. In one embodiment, at least some of the plurality of machine learning based segmentation networks are implemented with different hyperparameters.

In one embodiment, the one or more lesions comprise one or more brain lesions located on a brain of a patient.

These and other advantages of the invention will be apparent to those of ordinary skill in the art by reference to the following detailed description and the accompanying drawings.

BRIEF DESCRIPTION OF THE DRAWINGS

FIG. 3 shows a table of performance of embodiments described herein;

DETAILED DESCRIPTION

The present invention generally relates to methods and systems for multiscale subnetwork fusion with adaptive data sampling for brain lesions detection and segmentation. Embodiments of the present invention are described herein to give a visual understanding of such methods and systems. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system. Further, reference herein to pixels of an image refer equally to voxels of an image and vice versa, unless otherwise noted.

Embodiments described herein provide for an AI/ML (artificial intelligence/machine learning) based system for both detecting small brain lesions and segmenting large complex brain lesions from medical images of a brain of a patient. The AI/ML based system comprises a plurality of independent machine learning based segmentation networks each trained to perform the segmentation on image patches with different field of view sizes using adaptive data sampling, thereby effectively optimizing each segmentation network's sensitivity for a specific target lesion size. By combining the initial segmentation mask from the plurality of independent segmentation networks, the detection sensitivity for small lesion detection and the accuracy of large lesion segmentation is improved. Advantageously, embodiments described herein mitigate the technical challenges of conventional approaches for brain lesion detection and segmentation to thereby support clinicians to efficiently diagnose and treat patients with neurological diseases.

Figure 1:
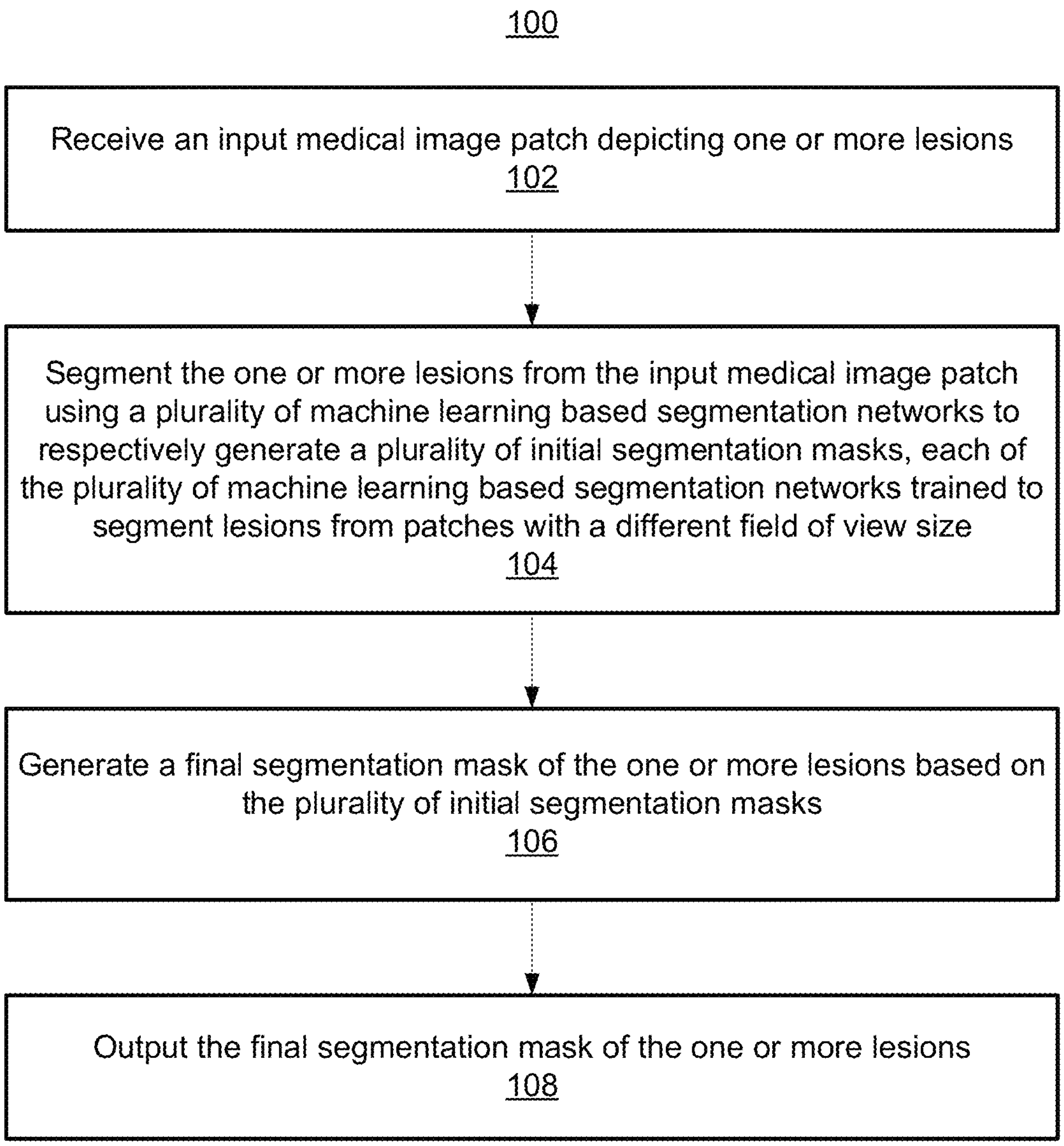
FIG. 1 shows a method for detecting and segmenting one or more lesions from an input medical image patch using a plurality of machine learning based segmentation networks, in accordance with one or more embodiments.

FIG. 1 shows a method 100 for detecting and segmenting one or more lesions from an input medical image patch using a plurality of machine learning based segmentation networks, in accordance with one or more embodiments. The steps of method 100 may be performed by one or more suitable computing devices, such as, e.g., computer 602 of FIG. 6.

At step 102 of FIG. 1, an input medical image patch depicting one or more lesions is received. The one or more lesions may comprise tumors, nodules, or any other abnormality. In one embodiment, the one or more lesions comprise one or more brain lesions located on a brain of the patient. However, the one or more lesions may be located on any other suitable anatomical object of interest of a patient, such as, e.g., other organs, bones, vessels, etc.

In one embodiment, the input medical image patch comprises an MR (magnetic resonance) image patch. However, the input medical image patch may be of any other suitable modality, such as, e.g., CT (computed tomography), US (ultrasound), x-ray, or any other medical imaging modality or combinations of medical imaging modalities. The input medical image patch may be a 2D (two dimensional) patch or a 3D (three dimensional) patch. The input medical image patch may be extracted from an acquired medical image of the patient (e.g., around the one or more lesions) or the input medical image patch may be the entire acquired medical image. The input medical image patch may have any suitable field of view size.

The input medical image patch may be received directly from an image acquisition device, such as, e.g., a MR scanner, as the input medical image patch is acquired, or can be received by loading a previously acquired image patch from a storage or memory of a computer system, or can be received by receiving an image patch from a remote computer system.

At step 104 of FIG. 1, the one or more lesions are segmented from the input medical image patch using a plurality of machine learning based segmentation networks to respectively generate a plurality of initial segmentation masks. Each of the plurality of machine learning based segmentation networks is trained to segment lesions from patches with a different field of view size. The field of view size refers to the size of the field of view of a patch. For example, the field of view size may be denoted in terms of voxels (or pixels), such as, e.g., 32×32×32 for smaller lesions or 128×128×128 for larger lesions.

In one embodiment, the plurality of machine learning based segmentation networks comprise a plurality of 3D patch-based encoder-decoder based networks. The encoder network of each of the plurality of encoder-decoder based networks receives as input the input medical image patch and encodes the input medical image patch to generate embeddings representing latent features of the input medical image patch as output. The decoder network of each of the plurality of encoder-decoder based networks receives as input the embeddings output from its corresponding encoder network and decodes the embeddings to generate a respective initial segmentation mask. The plurality of machine learning based segmentation networks may be of any other suitable network architecture.

Each of the plurality of machine learning based segmentation networks are independent and different. For instance, in one embodiment, at least some of the plurality of machine learning based segmentation networks are trained differently. For example, at least some of the plurality of machine learning based segmentation networks may be trained to segment lesions from patches with a different field of view size (e.g., using different training data corresponding to the field of view size). In another example, at least some of the plurality of machine learning based segmentation networks may be trained to segment lesions from patches according to a same or different loss functions (e.g., that prioritize performance for patches with a particular field of view size). Exemplary loss functions include cross-entropy loss, volume-adaptive softdice loss, boundary loss, etc. In one embodiment, at least some of the plurality of machine learning based segmentation networks may be implemented with different network architectures. In one embodiment, at least some of the plurality of machine learning based segmentation networks may be implemented with a same or different hyperparameters (e.g., depending on the target application). For example, some of the plurality of machine learning based segmentation networks may have a smaller number of layers while others of the plurality of machine learning based segmentation networks may have a larger number of layers.

The plurality of machine learning based segmentation networks are trained for segmenting lesions from patches during a prior offline or training stage using training data. In one embodiment, the plurality of machine learning based segmentation networks are trained as discussed below with regards to FIG. 2. Once trained, the plurality of machine learning based segmentation networks are applied during an online or inference stage for segmenting lesions from patches, such as, e.g., at step 104 of FIG. 1.

In one embodiment, the plurality of initial segmentation masks may be probability maps where each respective voxel (or pixel) has an intensity value ranging from, e.g., 0 to 1 indicating a probability that the corresponding voxel in the input medical image patch depicts a lesion. In another embodiment, the plurality of initial segmentation masks may be binary maps generated by, for example, applying a threshold (e.g., 0.5) to the probability maps, where each respective voxel of the binary maps has an intensity value of, e.g., 1 indicating that the corresponding voxel in the input medical image patch depicts a lesion or, e.g., 0 indicating that the corresponding voxel in the input medical image patch does not depict a lesion. The segmentation masks may be in any other suitable form.

At step 106 of FIG. 1, a final segmentation mask of the one or more lesions is generated based on the plurality of initial segmentation masks. The final segmentation mask may be a probability map, a binary map, or may be represented in any other suitable form. The final segmentation mask may be generated according to any suitable approach. In one embodiment, the final segmentation mask is generated by combining the plurality of initial segmentation masks and generating the final segmentation mask based on the combined initial segmentation masks.

The plurality of initial segmentation masks may be combined by a multi-scale feature generation module that computationally combines the plurality of initial segmentation masks. For example, in one embodiment, the multi-scale feature generation module respectively combines the intensity values of corresponding voxels in the plurality of initial segmentation masks into respective scores. The intensity values of corresponding voxels may be combined using any suitable approach, such as, e.g., mean, median, mode, addition, etc. The scores may be represented in a feature vector representing the combined initial segmentation masks.

The final segmentation mask is then generated based on the feature vector using a machine learning based fusion network. The machine learning based fusion vector receives as input the feature vector of scores and generates as output the final segmentation mask. In one embodiment, the machine learning based fusion network is implemented as random forests or boosting trees to perform fusion by a weighted vote. In another embodiment, the machine learning based fusion network is implemented as an encoder-decoder network. However, the machine learning based fusion network may be implemented according to any other suitable network architecture.

The machine learning based fusion network is trained during a prior offline or training stage using training data. In one embodiment, the machine learning based fusion network is trained as discussed below with regards to FIG. 2. Once trained, the machine learning based fusion network is applied during an online or inference stage for generating a final segmentation mask, such as, e.g., at step 106 of FIG. 1.

At step 108 of FIG. 1, the final segmentation mask of the one or more lesions is output. For example, the final segmentation mask of the one or more lesions can be output by displaying the final segmentation mask on a display device of a computer system, storing the final segmentation mask on a memory or storage of a computer system, or by final segmentation mask of the assessment to a remote computer system.

Figure 2:
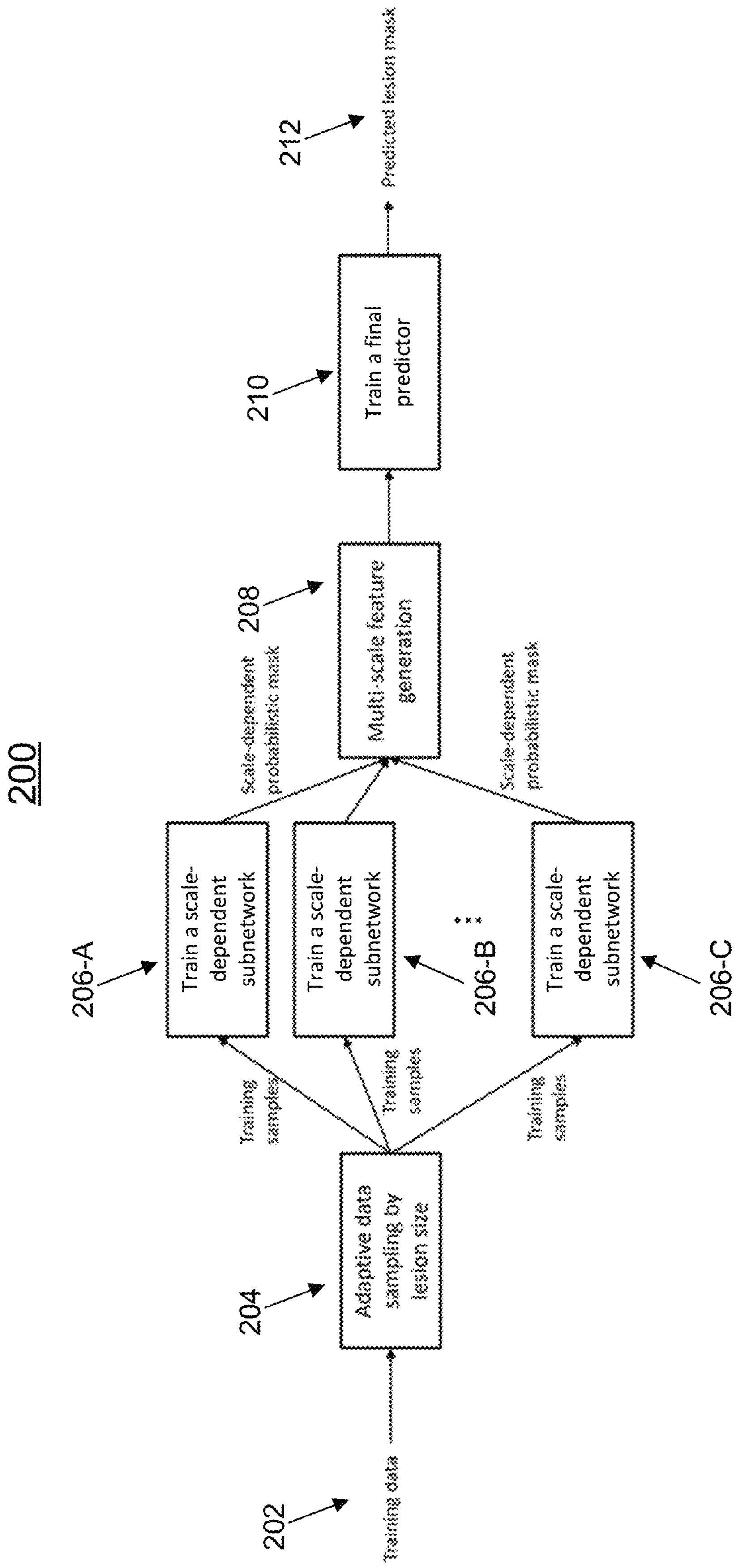
FIG. 2 shows a workflow for training machine learning based networks for generating a final segmentation mask, in accordance with one or more embodiments.

FIG. 2 shows a workflow 200 for training machine learning based networks for generating a final segmentation mask, in accordance with one or more embodiments. Workflow 200 is performed during a prior offline or training stage to train various machine learning based networks for generating a final segmentation mask. Once trained, the trained machine learning based networks are applied during an online or inference state. In one example, the scale-dependent subnetworks trained at steps 206-A, 206-B, and 206-C in workflow 200 are the plurality of machine learning based segmentation networks utilized at step 104 of FIG. 1 and final predictor network trained at step 210 is the machine learning based fusion network utilized at step 106 of FIG. 1.

In workflow 200, training data 202 is received. Training data 202 comprises training medical images of a patient population depicting at least one lesion. Adaptive data sampling 204 by lesion size is performed to extract training patches depicting one or more lesions from the training medical images of training data 202 as training samples. The training patches are extracted based on the size of the at least one lesion depicted in the training medical images. In one embodiment, adaptive data sampling 204 may be performed by utilizing precomputed bounding boxes of ground truth annotated lesions or online connect component analysis of the lesions.

Scale-dependent subnetworks are then individually trained at steps 206-A, 206-B, and 206-C (collectively referred to as scale-dependent subnetwork training 206) on the training samples to generate initial segmentation masks as scale-dependent probabilistic masks. The scale-dependent subnetworks may be implemented as encoder-decoder networks. Each of the scale-dependent subnetworks are independent and different. In one embodiment, one or more of the scale-dependent subnetworks are trained at scale-dependent subnetwork training 206 differently. For example, one or more of the scale-dependent subnetworks may be trained to segment lesions from patches with a different field of view size (e.g., using different training data corresponding to the field of view size). In another example, one or more of the scale-dependent subnetworks may be trained to segment lesions from patches according to a same or different loss functions (e.g., that prioritize performance for patches with a particular field of view size). Scale-dependent subnetworks may be first trained with unsupervised learning, then refined with supervised learning with annotated samples. In one embodiment, one or more of the scale-dependent subnetworks may be implemented with different network architectures. In one embodiment, one or more of the scale-dependent subnetworks may be implemented with a same or different hyperparameters (e.g., depending on the target application).

Multi-scale feature generation module 208 then computationally combines the scale-dependent probabilistic masks by respectively combining the intensity values of each set of corresponding voxels in the scale-dependent probabilistic masks into a score and the scores of each of the sets of corresponding voxels are represented in a feature vector. Final predictor network is then trained 210 to generate final predicted lesion mask 212 from the feature vector. The final predictor network may be trained 210 with supervised learning using training data 202 with ground truth segmentations. To characterize biased predictions and false positives of each subnetwork, the predicted lesions (in the scale-dependent probabilistic masks) output from scale-dependent subnetworks can be used to generate features using pre-defined window kernels (representing patch areas of the medical images) for training 210 final predictor network. The features can be sampled from window kernels of both lesion area and normal area. In one embodiment, the final predictor network may be implemented as random forests or boosting trees trained on the generated features to perform fusion by a weighted vote. In another embodiment, the final predictor network may be implemented as an encoder-decoder network.

Embodiments described herein were experimentally validated. A 3D U-Net system was trained and evaluated to detect and segment intraparenchymal brain metastases with a size greater than 2 mm (millimeters) using 1856 MRI volumes from 1791 patients treated with SRS (stereotactic radiosurgery) from seven institutions (1539 volumes for training, 183 for validation, and 134 for testing). All patients had 3D post-Gd (gadolinium) T1w (T1-weighted) MRI scans pre-SRS. Gross tumor volumes (GTVs) of brain metastases for SRS were curated by each institute first. Then, additional efforts were spent to create GTVs for the untreated and/or uncontoured metastases, including central reviews by 2 radiologists, to improve accuracy of ground truth. The training dataset was augmented with synthetic metastases of 3773 MRIs using a 3D generative pipeline. The proposed system was comprised of two U-Nets with one using small 3D patches dedicated for detecting small metastases and another using large 3D patches for segmenting large metastases, and a random-forest based fusion module for combining the two network outputs. The first U-Net was trained with 3D patches comprising at least one metastasis less than 0.1 $cm^3$ (cubic centimeters). For detection performance, metastases-level sensitivity and case-level false-positive (FP) rate was measured. For segmentation performance, brain metastases-level Dice similarity coefficient (DSC) and 95-percentile Hausdorff distance (HD95) was measured. Performance was also stratified based upon brain metastases sizes.

FIG. 3 shows a table 300 of performance of embodiments described herein by brain metastases size, where N is the number of brain metastases in each category. For 739 brain metastases in the 134 testing cases, the overall lesion-level sensitivity was 0.870 with an average case-level FP of 1.34±1.92 (95% CI: 1.02-1.67). The sensitivity was 0.969 for the brain metastases greater than 0.1 $cm^3$, but dropped to 0.755 for the brain metastases less than 0.1 $cm^3$ (as shown in table 300). The average DSC and HD95 for all detected brain metastases were 0.786 and 1.35 mm. The worse performance for brain metastases greater than 20 $cm^3$ was caused by a case with 83 $cm^3$ GTV and artifacts in the MRI volume.

Excellent detection sensitivity and segmentation accuracy was achieved for brain metastases greater than 0.1 $cm^3$, and promising performance for small brain metastases (less than 0.1 $cm^3$) with a controlled FP rate using a large multi-institutional dataset.

Embodiments described herein are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the providing system.

Furthermore, certain embodiments described herein are described with respect to methods and systems utilizing trained machine learning based models, as well as with respect to methods and systems for training machine learning based models. Features, advantages or alternative embodiments herein can be assigned to the other claimed objects and vice versa. In other words, claims for methods and systems for training a machine learning based model can be improved with features described or claimed in context of the methods and systems for utilizing a trained machine learning based model, and vice versa.

In particular, the trained machine learning based models applied in embodiments described herein can be adapted by the methods and systems for training the machine learning based models. Furthermore, the input data of the trained machine learning based model can comprise advantageous features and embodiments of the training input data, and vice versa. Furthermore, the output data of the trained machine learning based model can comprise advantageous features and embodiments of the output training data, and vice versa.

In general, a trained machine learning based model mimics cognitive functions that humans associate with other human minds. In particular, by training based on training data, the trained machine learning based model is able to adapt to new circumstances and to detect and extrapolate patterns.

In general, parameters of a machine learning based model can be adapted by means of training. In particular, supervised training, semi-supervised training, unsupervised training, reinforcement learning and/or active learning can be used. Furthermore, representation learning (an alternative term is "feature learning") can be used. In particular, the parameters of the trained machine learning based model can be adapted iteratively by several steps of training.

In particular, a trained machine learning based model can comprise a neural network, a support vector machine, a decision tree, and/or a Bayesian network, and/or the trained machine learning based model can be based on k-means clustering, Q-learning, genetic algorithms, and/or association rules. In particular, a neural network can be a deep neural network, a convolutional neural network, or a convolutional deep neural network. Furthermore, a neural network can be an adversarial network, a deep adversarial network and/or a generative adversarial network.

Figure 4:
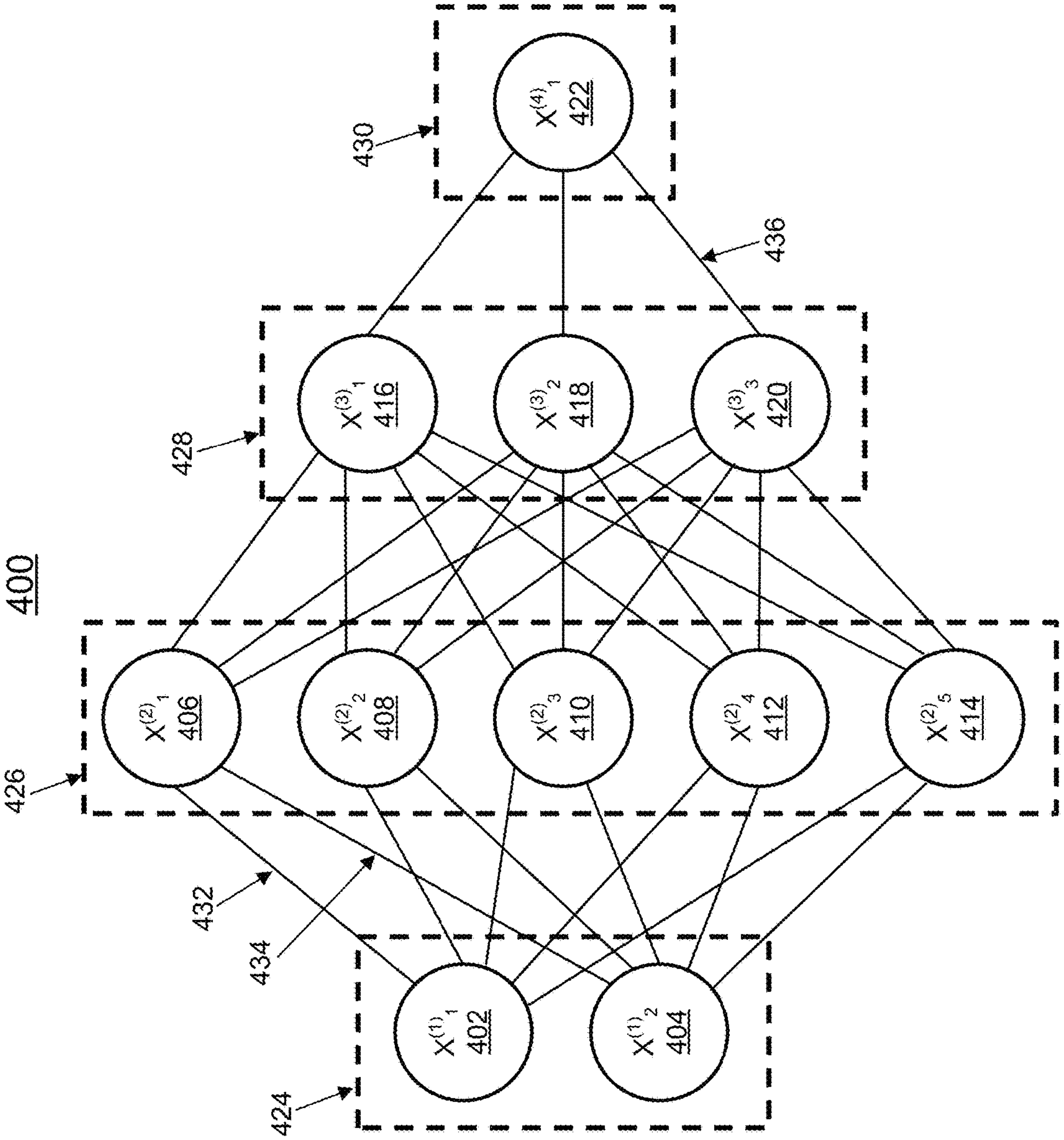
FIG. 4 shows an exemplary artificial neural network that may be used to implement one or more embodiments.

FIG. 4 shows an embodiment of an artificial neural network 400, in accordance with one or more embodiments. Alternative terms for "artificial neural network" are "neural network", "artificial neural net" or "neural net". Machine learning networks described herein, such as, e.g., the plurality of machine learning based segmentation networks utilized at step 104 and the machine learning based fusion network utilized at step 106 of FIG. 1 and the scale-dependent subnetworks trained at steps 206 and the final predictor network trained at step 210 in workflow 200 of FIG. 2, may be implemented using artificial neural network 400.

The artificial neural network 400 comprises nodes 402-422 and edges 432, 434, . . . , 436, wherein each edge 432, 434, . . . , 436 is a directed connection from a first node 402-422 to a second node 402-422. In general, the first node 402-422 and the second node 402-422 are different nodes 402-422, it is also possible that the first node 402-422 and the second node 402-422 are identical. For example, in FIG. 4, the edge 432 is a directed connection from the node 402 to the node 406, and the edge 434 is a directed connection from the node 404 to the node 406. An edge 432, 434, . . . , 436 from a first node 402-422 to a second node 402-422 is also denoted as "ingoing edge" for the second node 402-422 and as "outgoing edge" for the first node 402-422.

In this embodiment, the nodes 402-422 of the artificial neural network 400 can be arranged in layers 424-430, wherein the layers can comprise an intrinsic order introduced by the edges 432, 434, . . . , 436 between the nodes 402-422. In particular, edges 432, 434, . . . , 436 can exist only between neighboring layers of nodes. In the embodiment shown in FIG. 4, there is an input layer 424 comprising only nodes 402 and 404 without an incoming edge, an output layer 430 comprising only node 422 without outgoing edges, and hidden layers 426, 428 in-between the input layer 424 and the output layer 430. In general, the number of hidden layers 426, 428 can be chosen arbitrarily. The number of nodes 402 and 404 within the input layer 424 usually relates to the number of input values of the neural network 400, and the number of nodes 422 within the output layer 430 usually relates to the number of output values of the neural network 400.

In particular, a (real) number can be assigned as a value to every node 402-422 of the neural network 400. Here, $x^{(n)}_i$ denotes the value of the i-th node 402-422 of the n-th layer 424-430. The values of the nodes 402-422 of the input layer 424 are equivalent to the input values of the neural network 400, the value of the node 422 of the output layer 430 is equivalent to the output value of the neural network 400. Furthermore, each edge 432, 434, . . . , 436 can comprise a weight being a real number, in particular, the weight is a real number within the interval [−1, 1] or within the interval [0, 1]. Here, $w^{(m,n)}_{i,j}$ denotes the weight of the edge between the i-th node 402-422 of the m-th layer 424-430 and the j-th node 402-422 of the n-th layer 424-430. Furthermore, the abbreviation $w^{(n)}_{i,j}$ is defined for the weight $w^{(n,n+1)}_{i,j}$.

In particular, to calculate the output values of the neural network 400, the input values are propagated through the neural network. In particular, the values of the nodes 402-422 of the (n+1)-th layer 424-430 can be calculated based on the values of the nodes 402-422 of the n-th layer 424-430 by $$x_j^{(n+1)} = f\left(\sum_i x_i^{(n)} \cdot w_{i,j}^{(n)}\right).$$

Herein, the function f is a transfer function (another term is "activation function"). Known transfer functions are step functions, sigmoid function (e.g. the logistic function, the generalized logistic function, the hyperbolic tangent, the Arctangent function, the error function, the smoothstep function) or rectifier functions. The transfer function is mainly used for normalization purposes.

In particular, the values are propagated layer-wise through the neural network, wherein values of the input layer 424 are given by the input of the neural network 400, wherein values of the first hidden layer 426 can be calculated based on the values of the input layer 424 of the neural network, wherein values of the second hidden layer 428 can be calculated based in the values of the first hidden layer 426, etc.

In order to set the values $w^{(m,n)}_{i,j}$ for the edges, the neural network 400 has to be trained using training data. In particular, training data comprises training input data and training output data (denoted as $t_i$). For a training step, the neural network 400 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 400 (backpropagation algorithm). In particular, the weights are changed according to $$w'^{(n)}_{i,j} = w^{(n)}_{i,j} - \gamma \cdot \delta^{(n)}_j \cdot x^{(n)}_i$$

wherein $\gamma$ is a learning rate, and the numbers $\delta^{(n)}_j$ can be recursively calculated as $$\delta^{(n)}_j = \left(\sum_k \delta^{(n+1)}_k \cdot w^{(n+1)}_{j,k}\right) \cdot f'\left(\sum_i x^{(n)}_i \cdot w^{(n)}_{i,j}\right)$$

based on $\delta^{(n+1)}_j$, if the (n+1)-th layer is not the output layer, and $$\delta^{(n)}_j = \left(x^{(n+1)}_k - t^{(n+1)}_j\right) \cdot f'\left(\sum_i x^{(n)}_i \cdot w^{(n)}_{i,j}\right)$$

if the (n+1)-th layer is the output layer 430, wherein f' is the first derivative of the activation function, and $y^{(n+1)}_j$ is the comparison training value for the j-th node of the output layer 430.

Figure 5:
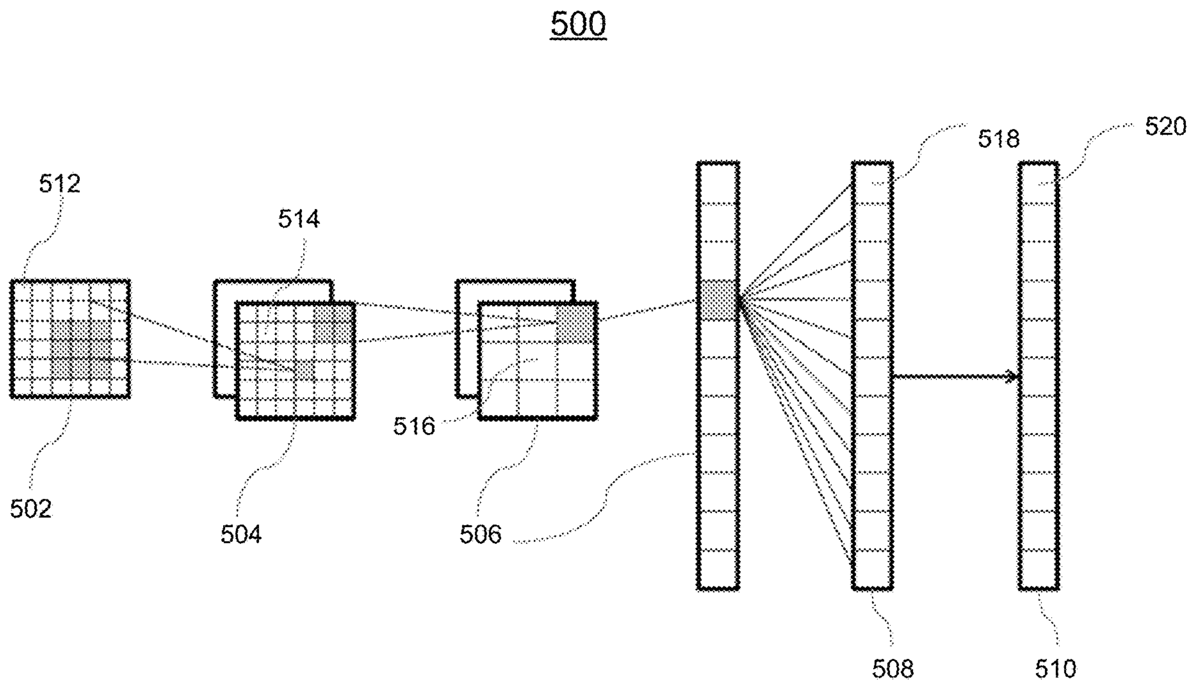
FIG. 5 shows a convolutional neural network that may be used to implement one or more embodiments.

FIG. 5 shows a convolutional neural network 500, in accordance with one or more embodiments. Machine learning networks described herein, such as, e.g., the plurality of machine learning based segmentation networks utilized at step 104 and the machine learning based fusion network utilized at step 106 of FIG. 1 and the scale-dependent subnetworks trained at steps 206 and the final prediction network trained at step 210 in workflow 200 of FIG. 2, may be implemented using convolutional neural network 500.

In the embodiment shown in FIG. 5, the convolutional neural network comprises 500 an input layer 502, a convolutional layer 504, a pooling layer 506, a fully connected layer 508, and an output layer 510. Alternatively, the convolutional neural network 500 can comprise several convolutional layers 504, several pooling layers 506, and several fully connected layers 508, as well as other types of layers. The order of the layers can be chosen arbitrarily, usually fully connected layers 508 are used as the last layers before the output layer 510.

In particular, within a convolutional neural network 500, the nodes 512-520 of one layer 502-510 can be considered to be arranged as a d-dimensional matrix or as a d-dimensional image. In particular, in the two-dimensional case the value of the node 512-520 indexed with i and j in the n-th layer 502-510 can be denoted as $x^{(n)}_{[i,j]}$. However, the arrangement of the nodes 512-520 of one layer 502-510 does not have an effect on the calculations executed within the convolutional neural network 500 as such, since these are given solely by the structure and the weights of the edges.

In particular, a convolutional layer 504 is characterized by the structure and the weights of the incoming edges forming a convolution operation based on a certain number of kernels. In particular, the structure and the weights of the incoming edges are chosen such that the values $x^{(n)}_k$ of the nodes 514 of the convolutional layer 504 are calculated as a convolution $x^{(n)}_k = K_k * x^{(n-1)}$ based on the values $x^{(n-1)}$ of the nodes 512 of the preceding layer 502, where the convolution * is defined in the two-dimensional case as $$x^{(n)}_k[i, j] = (K_k * x^{(n-1)})[i, j] = \sum_{i'} \sum_{j'} K_k[i', j'] \cdot x^{(n-1)}[i - i', j - j'].$$

Here the k-th kernel $K_k$ is a d-dimensional matrix (in this embodiment a two-dimensional matrix), which is usually small compared to the number of nodes 512-518 (e.g. a 3×3 matrix, or a 5×5 matrix). In particular, this implies that the weights of the incoming edges are not independent, but chosen such that they produce said convolution equation. In particular, for a kernel being a 3×3 matrix, there are only 9 independent weights (each entry of the kernel matrix corresponding to one independent weight), irrespectively of the number of nodes 512-520 in the respective layer 502-510. In particular, for a convolutional layer 504, the number of nodes 514 in the convolutional layer is equivalent to the number of nodes 512 in the preceding layer 502 multiplied with the number of kernels.

If the nodes 512 of the preceding layer 502 are arranged as a d-dimensional matrix, using a plurality of kernels can be interpreted as adding a further dimension (denoted as "depth" dimension), so that the nodes 514 of the convolutional layer 504 are arranged as a (d+1)-dimensional matrix. If the nodes 512 of the preceding layer 502 are already arranged as a (d+1)-dimensional matrix comprising a depth dimension, using a plurality of kernels can be interpreted as expanding along the depth dimension, so that the nodes 514 of the convolutional layer 504 are arranged also as a (d+1)-dimensional matrix, wherein the size of the (d+1)-dimensional matrix with respect to the depth dimension is by a factor of the number of kernels larger than in the preceding layer 502.

The advantage of using convolutional layers 504 is that spatially local correlation of the input data can exploited by enforcing a local connectivity pattern between nodes of adjacent layers, in particular by each node being connected to only a small region of the nodes of the preceding layer.

In embodiment shown in FIG. 5, the input layer 502 comprises 36 nodes 512, arranged as a two-dimensional 6×6 matrix. The convolutional layer 504 comprises 72 nodes 514, arranged as two two-dimensional 6×6 matrices, each of the two matrices being the result of a convolution of the values of the input layer with a kernel. Equivalently, the nodes 514 of the convolutional layer 504 can be interpreted as arranges as a three-dimensional 6×6×2 matrix, wherein the last dimension is the depth dimension.

A pooling layer 506 can be characterized by the structure and the weights of the incoming edges and the activation function of its nodes 516 forming a pooling operation based on a non-linear pooling function f. For example, in the two dimensional case the values $x^{(n)}$ of the nodes 516 of the pooling layer 506 can be calculated based on the values $x^{(n-1)}$ of the nodes 514 of the preceding layer 504 as $$x^{(n)}[i, j] = f\left(x^{(n-1)}[id_1, jd_2], \ldots , x^{(n-1)}[id_1 + d_1 - 1, jd_2 + d_2 - 1]\right)$$

In other words, by using a pooling layer 506, the number of nodes 514, 516 can be reduced, by replacing a number d1·d2 of neighboring nodes 514 in the preceding layer 504 with a single node 516 being calculated as a function of the values of said number of neighboring nodes in the pooling layer. In particular, the pooling function f can be the max-function, the average or the L2-Norm. In particular, for a pooling layer 506 the weights of the incoming edges are fixed and are not modified by training.

The advantage of using a pooling layer 506 is that the number of nodes 514, 516 and the number of parameters is reduced. This leads to the amount of computation in the network being reduced and to a control of overfitting.

In the embodiment shown in FIG. 5, the pooling layer 506 is a max-pooling, replacing four neighboring nodes with only one node, the value being the maximum of the values of the four neighboring nodes. The max-pooling is applied to each d-dimensional matrix of the previous layer; in this embodiment, the max-pooling is applied to each of the two two-dimensional matrices, reducing the number of nodes from 72 to 18.

A fully-connected layer 508 can be characterized by the fact that a majority, in particular, all edges between nodes 516 of the previous layer 506 and the nodes 518 of the fully-connected layer 508 are present, and wherein the weight of each of the edges can be adjusted individually.

In this embodiment, the nodes 516 of the preceding layer 506 of the fully-connected layer 508 are displayed both as two-dimensional matrices, and additionally as non-related nodes (indicated as a line of nodes, wherein the number of nodes was reduced for a better presentability). In this embodiment, the number of nodes 518 in the fully connected layer 508 is equal to the number of nodes 516 in the preceding layer 506. Alternatively, the number of nodes 516, 518 can differ.

Furthermore, in this embodiment, the values of the nodes 520 of the output layer 510 are determined by applying the Softmax function onto the values of the nodes 518 of the preceding layer 508. By applying the Softmax function, the sum the values of all nodes 520 of the output layer 510 is 1, and all values of all nodes 520 of the output layer are real numbers between 0 and 1.

A convolutional neural network 500 can also comprise a ReLU (rectified linear units) layer or activation layers with non-linear transfer functions. In particular, the number of nodes and the structure of the nodes contained in a ReLU layer is equivalent to the number of nodes and the structure of the nodes contained in the preceding layer. In particular, the value of each node in the ReLU layer is calculated by applying a rectifying function to the value of the corresponding node of the preceding layer.

The input and output of different convolutional neural network blocks can be wired using summation (residual/dense neural networks), element-wise multiplication (attention) or other differentiable operators. Therefore, the convolutional neural network architecture can be nested rather than being sequential if the whole pipeline is differentiable.

In particular, convolutional neural networks 500 can be trained based on the backpropagation algorithm. For preventing overfitting, methods of regularization can be used, e.g. dropout of nodes 512-520, stochastic pooling, use of artificial data, weight decay based on the L1 or the L2 norm, or max norm constraints. Different loss functions can be combined for training the same neural network to reflect the joint training objectives. A subset of the neural network parameters can be excluded from optimization to retain the weights pretrained on another datasets.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIG. 1 or 2. Certain steps or functions of the methods and workflows described herein, including one or more of the steps or functions of FIG. 1 or 2, may be performed by a server or by another processor in a network-based cloud-computing system. Certain steps or functions of the methods and workflows described herein, including one or more of the steps of FIG. 1 or 2, may be performed by a client computer in a network-based cloud computing system. The steps or functions of the methods and workflows described herein, including one or more of the steps of FIG. 1 or 2, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIG. 1 or 2, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
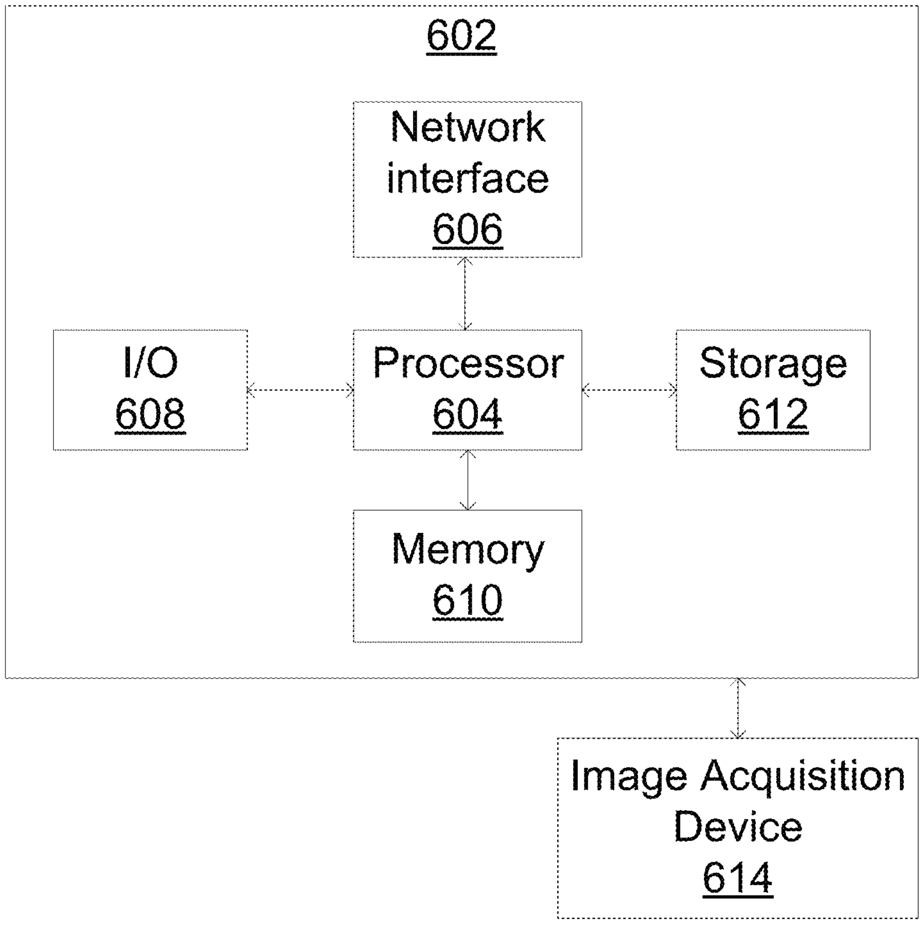
FIG. 6 shows a high-level block diagram of a computer that may be used to implement one or more embodiments.

A high-level block diagram of an example computer 602 that may be used to implement systems, apparatus, and methods described herein is depicted in FIG. 6. Computer 602 includes a processor 604 operatively coupled to a data storage device 612 and a memory 610. Processor 604 controls the overall operation of computer 602 by executing computer program instructions that define such operations. The computer program instructions may be stored in data storage device 612, or other computer readable medium, and loaded into memory 610 when execution of the computer program instructions is desired. Thus, the method and workflow steps or functions of FIG. 1 or 2 can be defined by the computer program instructions stored in memory 610 and/or data storage device 612 and controlled by processor 604 executing the computer program instructions. For example, the computer program instructions can be implemented as computer executable code programmed by one skilled in the art to perform the method and workflow steps or functions of FIG. 1 or 2. Accordingly, by executing the computer program instructions, the processor 604 executes the method and workflow steps or functions of FIG. 1 or 2. Computer 602 may also include one or more network interfaces 606 for communicating with other devices via a network. Computer 602 may also include one or more input/output devices 608 that enable user interaction with computer 602 (e.g., display, keyboard, mouse, speakers, buttons, etc.).

Processor 604 may include both general and special purpose microprocessors, and may be the sole processor or one of multiple processors of computer 602. Processor 604 may include one or more central processing units (CPUs), for example. Processor 604, data storage device 612, and/or memory 610 may include, be supplemented by, or incorporated in, one or more application-specific integrated circuits (ASICs) and/or one or more field programmable gate arrays (FPGAs).

Data storage device 612 and memory 610 each include a tangible non-transitory computer readable storage medium. Data storage device 612, and memory 610, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 608 may include peripherals, such as a printer, scanner, display screen, etc. For example, input/output devices 608 may include a display device such as a cathode ray tube (CRT) or liquid crystal display (LCD) monitor for displaying information to the user, a keyboard, and a pointing device such as a mouse or a trackball by which the user can provide input to computer 602.

An image acquisition device 614 can be connected to the computer 602 to input image data (e.g., medical images) to the computer 602. It is possible to implement the image acquisition device 614 and the computer 602 as one device. It is also possible that the image acquisition device 614 and the computer 602 communicate wirelessly through a network. In a possible embodiment, the computer 602 can be located remotely with respect to the image acquisition device 614.

Any or all of the systems and apparatus discussed herein may be implemented using one or more computers such as computer 602.

One skilled in the art will recognize that an implementation of an actual computer or computer system may have other structures and may contain other components as well, and that FIG. 6 is a high level representation of some of the components of such a computer for illustrative purposes.

Independent of the grammatical term usage, individuals with male, female or other gender identities are included within the term.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The following is a list of non-limiting illustrative embodiments disclosed herein:

Illustrative embodiment 1. A computer-implemented method comprising: receiving an input medical image patch depicting one or more lesions; segmenting the one or more lesions from the input medical image patch using a plurality of machine learning based segmentation networks to respectively generate a plurality of initial segmentation masks, each of the plurality of machine learning based segmentation networks trained to segment lesions from patches with a different field of view size; generating a final segmentation mask of the one or more lesions based on the plurality of initial segmentation masks; and outputting the final segmentation mask of the one or more lesions.

Illustrative embodiment 2. The computer-implemented method of Illustrative embodiment 1, wherein generating a final segmentation mask of the one or more lesions based on the plurality of initial segmentation masks comprises: combining the plurality of initial segmentation masks; and generating the final segmentation mask based on the combined initial segmentation masks.

Illustrative embodiment 3. The computer-implemented method of any one of illustrative embodiments 1-2, wherein combining the plurality of initial segmentation masks comprises: combining intensity values of corresponding voxels in the plurality of initial segmentation masks into respective scores.

Illustrative embodiment 4. The computer-implemented method of any one of illustrative embodiments 1-3, wherein generating the final segmentation mask based on the combined initial segmentation masks comprises: generating the final segmentation mask based on the scores using a machine learning based fusion network.

Illustrative embodiment 5. The computer-implemented method of any one of illustrative embodiments 1-4, wherein the plurality of machine learning based segmentation networks are trained by extracting training patches from training medical images depicting at least one lesion, the training patches extracted from the training medical images based on a size of the at least one lesion.

Illustrative embodiment 6. The computer-implemented method of any one of illustrative embodiments 1-5, wherein at least some of the plurality of machine learning based segmentation networks are trained with different loss functions.

Illustrative embodiment 7. The computer-implemented method of any one of illustrative embodiments 1-6, wherein at least some of the plurality of machine learning based segmentation networks are implemented with different network architectures.

Illustrative embodiment 8. The computer-implemented method of any one of illustrative embodiments 1-7, wherein at least some of the plurality of machine learning based segmentation networks are implemented with different hyperparameters.

Illustrative embodiment 9. The computer-implemented method of any one of illustrative embodiments 1-8, wherein the one or more lesions comprise one or more brain lesions located on a brain of a patient.

Illustrative embodiment 10. An apparatus comprising: means for receiving an input medical image patch depicting one or more lesions; means for segmenting the one or more lesions from the input medical image patch using a plurality of machine learning based segmentation networks to respectively generate a plurality of initial segmentation masks, each of the plurality of machine learning based segmentation networks trained to segment lesions from patches with a different field of view size; means for generating a final segmentation mask of the one or more lesions based on the plurality of initial segmentation masks; and means for outputting the final segmentation mask of the one or more lesions.

Illustrative embodiment 11. The apparatus of illustrative embodiment 10, wherein the means for generating a final segmentation mask of the one or more lesions based on the plurality of initial segmentation masks comprises: means for combining the plurality of initial segmentation masks; and means for generating the final segmentation mask based on the combined initial segmentation masks.

Illustrative embodiment 12. The apparatus of any one of illustrative embodiments 10-11, wherein the means for combining the plurality of initial segmentation masks comprises: means for combining intensity values of corresponding voxels in the plurality of initial segmentation masks into respective scores.

Illustrative embodiment 13. The apparatus of any one of illustrative embodiments 10-12, wherein the means for generating the final segmentation mask based on the combined initial segmentation masks comprises: means for generating the final segmentation mask based on the scores using a machine learning based fusion network.

Illustrative embodiment 14. The apparatus of any one of illustrative embodiments 10-13, wherein the plurality of machine learning based segmentation networks are trained by extracting training patches from training medical images depicting at least one lesion, the training patches extracted from the training medical images based on a size of the at least one lesion.

Illustrative embodiment 15. A non-transitory computer readable medium storing computer program instructions, the computer program instructions when executed by a processor cause the processor to perform operations comprising: receiving an input medical image patch depicting one or more lesions; segmenting the one or more lesions from the input medical image patch using a plurality of machine learning based segmentation networks to respectively generate a plurality of initial segmentation masks, each of the plurality of machine learning based segmentation networks trained to segment lesions from patches with a different field of view size; generating a final segmentation mask of the one or more lesions based on the plurality of initial segmentation masks; and outputting the final segmentation mask of the one or more lesions.

Illustrative embodiment 16. The non-transitory computer readable medium of illustrative embodiment 15, wherein generating a final segmentation mask of the one or more lesions based on the plurality of initial segmentation masks comprises: combining the plurality of initial segmentation masks; and generating the final segmentation mask based on the combined initial segmentation masks.

Illustrative embodiment 17. The non-transitory computer readable medium of any one of illustrative embodiments 15-16, wherein at least some of the plurality of machine learning based segmentation networks are trained with different loss functions.

Illustrative embodiment 18. The non-transitory computer readable medium of any one of illustrative embodiments 15-17, wherein at least some of the plurality of machine learning based segmentation networks are implemented with different network architectures.

Illustrative embodiment 19. The non-transitory computer readable medium of any one of illustrative embodiments 15-18, wherein at least some of the plurality of machine learning based segmentation networks are implemented with different hyperparameters.

Illustrative embodiment 20. The non-transitory computer readable medium of any one of illustrative embodiments 15-19, wherein the one or more lesions comprise one or more brain lesions located on a brain of a patient.

The invention claimed is:

1. A computer-implemented method comprising:

receiving an input medical image patch depicting one or more lesions;

segmenting the one or more lesions from the input medical image patch using a plurality of machine learning based segmentation networks to respectively generate a plurality of initial segmentation masks, each of the plurality of machine learning based segmentation networks trained to segment lesions from patches with a different field of view size;

generating a final segmentation mask of the one or more lesions by:

combining intensity values of corresponding voxels in the plurality of initial segmentation masks into respective scores, and generating the final segmentation mask based on the scores using a machine learning based fusion network, the machine learning based fusion network receiving as input the scores for each of the corresponding voxels in the plurality of initial segmentation masks and generating as output the final segmentation mask; and outputting the final segmentation mask of the one or more lesions.

2. The computer-implemented method of claim 1, wherein the plurality of machine learning based segmentation networks are trained by extracting training patches from training medical images depicting at least one lesion, the training patches extracted from the training medical images based on a size of the at least one lesion.

3. The computer-implemented method of claim 1, wherein at least some of the plurality of machine learning based segmentation networks are trained with different loss functions.

4. The computer-implemented method of claim 1, wherein at least some of the plurality of machine learning based segmentation networks are implemented with different network architectures.

5. The computer-implemented method of claim 1, wherein at least some of the plurality of machine learning based segmentation networks are implemented with different hyperparameters.

6. The computer-implemented method of claim 1, wherein the one or more lesions comprise one or more brain lesions located on a brain of a patient.

7. An apparatus comprising:

means for receiving an input medical image patch depicting one or more lesions;

means for segmenting the one or more lesions from the input medical image patch using a plurality of machine learning based segmentation networks to respectively generate a plurality of initial segmentation masks, each of the plurality of machine learning based segmentation networks trained to segment lesions from patches with a different field of view size;

means for generating a final segmentation mask of the one or more lesions by:

combining intensity values of corresponding voxels in the plurality of initial segmentation masks into respective scores, and generating the final segmentation mask based on the scores using a machine learning based fusion network, the machine learning based fusion network receiving as input the scores for each of the corresponding voxels in the plurality of initial segmentation masks and generating as output the final segmentation mask; and means for outputting the final segmentation mask of the one or more lesions.

8. The apparatus of claim 7, wherein the plurality of machine learning based segmentation networks are trained by extracting training patches from training medical images depicting at least one lesion, the training patches extracted from the training medical images based on a size of the at least one lesion.

9. A non-transitory computer readable medium storing computer program instructions, the computer program instructions when executed by a processor cause the processor to perform operations comprising:

receiving an input medical image patch depicting one or more lesions;

segmenting the one or more lesions from the input medical image patch using a plurality of machine learning based segmentation networks to respectively generate a plurality of initial segmentation masks, each of the plurality of machine learning based segmentation networks trained to segment lesions from patches with a different field of view size;

generating a final segmentation mask of the one or more lesions by:

combining intensity values of corresponding voxels in the plurality of initial segmentation masks into respective scores, and generating the final segmentation mask based on the scores using a machine learning based fusion network, the machine learning based fusion network receiving as input the scores for each of the corresponding voxels in the plurality of initial segmentation masks and generating as output the final segmentation mask; and outputting the final segmentation mask of the one or more lesions.

10. The non-transitory computer readable medium of claim 9, wherein at least some of the plurality of machine learning based segmentation networks are trained with different loss functions.

11. The non-transitory computer readable medium of claim 9, wherein at least some of the plurality of machine learning based segmentation networks are implemented with different network architectures.

12. The non-transitory computer readable medium of claim 9, wherein at least some of the plurality of machine learning based segmentation networks are implemented with different hyperparameters.

13. The non-transitory computer readable medium of claim 9, wherein the one or more lesions comprise one or more brain lesions located on a brain of a patient.

* * * * *